US006965935B2

(12) United States Patent
Diong

(10) Patent No.: US 6,965,935 B2
(45) Date of Patent: Nov. 15, 2005

(54) NETWORK ARCHITECTURE FOR INTERNET APPLIANCES

(76) Inventor: Chong Khai Diong, 26 Jalan TPP5/2, Puchong, Selaager (MY) 47100

( * ) Notice: Subject to any disclaimer, the term of this patent is extended or adjusted under 35 U.S.C. 154(b) by 754 days.

(21) Appl. No.: 09/846,866

(22) Filed: May 1, 2001

(65) Prior Publication Data

US 2002/0165953 A1 Nov. 7, 2002

(51) Int. Cl.[7] .......... G06F 15/173
(52) U.S. Cl. .......... 709/224; 709/217
(58) Field of Search .......... 709/220, 246, 709/224, 217; 710/36, 220; 379/102.03; 700/20; 713/1

(56) References Cited

U.S. PATENT DOCUMENTS 6,161,133 A * 12/2000 Kikinis .......... 709/220
6,415,023 B2 * 7/2002 Iggulden .......... 379/102.03
6,539,433 B1 * 3/2003 Tominaga et al. .......... 709/246
6,615,088 B1 * 9/2003 Myer et al. .......... 700/20
6,622,169 B2 * 9/2003 Kikinis .......... 709/220
6,651,118 B2 * 11/2003 Carau et al. .......... 710/36
6,748,471 B1 * 6/2004 Keeney et al. .......... 710/220
2002/0165953 A1 * 11/2002 Diong .......... 709/224

* cited by examiner

*Primary Examiner*—Wen-Tai Lin
*Assistant Examiner*—Jungwon Chang
(74) *Attorney, Agent, or Firm*—Jeffrey Furr

(57) ABSTRACT

The present invention provides a system and network architecture for a plurality of internet-enabled appliances to communicate with each other and with a plurality of users simultaneously in real time. In a preferred embodiment, a system in accordance with the present invention allows any appliance with built-in internet connectivity, or retrofitted with an interface device containing said connectivity, to communicate with a central server over the internet without human intervention. Software means is provided at the central server to enable such communication. Firmware and hardware means are provided for each appliance to connect to and disconnect from the central server on demand either through a dial-up connection or a dedicated communication line. The present invention allows for each device to send data to the central server, receive data from said server, or send data to and receive data from another device via the central server under user-programmable control means residing in the central server.

3 Claims, 4 Drawing Sheets

NETWORK ARCHITECTURE FOR INTERNET APPLIANCES

CROSS-REFERENCE TO RELATED APPLICATIONS (IF ANY)

None

STATEMENT AS TO RIGHTS TO INVENTION MADE UNDER FEDERALLY-SPONSORED RESEARCH AND DEVELOPMENT (IF ANY)

None

BACKGROUND

1. Field of the Invention

This invention relates to the art of embedded internet devices, and more particularly to a system and an architecture for providing real time interactivity between multiple devices and multiple users simultaneously.

2. Description of Prior Art

With the mass adoption of the internet in recent years, more and more people are getting connected to the internet, mostly through Personal Computers (PCs). More recently however, the focus is shifting from internet connectivity for people using PCs to internet connectivity for appliances using embedded internet devices Embedded internet devices are basically electronic devices that have microprocessors running a suitable set of software embedded into silicon (commonly known as a TCP/IP stack in firmware). This firmware enables the devices to communicate over the internet using Internet Protocol (IP) independent of a Personal Computer (PC) or equivalent machine.

Early internet devices are mostly designed as thin clients. These client devices connect to conventional servers over the internet to exchange data or request for services residing in the servers. Two common examples are the Wireless Application Protocol (WAP) mobile phones and Personal Digital Assistants (PDA). These embedded internet devices are usually operated by humans and primarily used to retrieve data from conventional servers.

The need for internet devices to operate independently of humans and PCs, as well as to provide rather than receive information has resulted in more recent internet devices designed as embedded servers rather than clients. Some of these devices have the capability of serving web pages as if they were conventional servers on the internet, albeit with limitations and much less functionality. Others have embedded email servers built-in, giving them the capability to send and receive emails.

These devices designed around embedded servers are usually deployed to operate independently without the need of any human intervention, and they are typically built as part of an appliance to enable the target appliance to be monitored or controlled remotely by a user over the internet. One of the main reasons for the deployment of embedded internet servers for internet appliances is to include functionality that would be unavailable on an embedded client For example, an appliance with an embedded mail server could report its status to a user by automatically sending out an email. Conversely, it could receive instructions from users via email. Another reason is to give users the ability to connect, monitor and control these appliances in real-time by logging directly onto the internet server embedded into the appliances.

However, deploying embedded internet servers to overcome limitations of embedded clients introduced a new set of limitations by themselves. This is very apparent in applications that are price sensitive, and in applications where appliances have to be connected directly to the internet without the aid of a LAN, PC or other comparatively heavy-duty machine.

As an example, for conventional embedded internet servers to be connected directly to the internet, a static IP address is required for each device. This would pose a huge burden on the IP address allocation as billions of internet devices are expected to come on stream in the near future Alternatively, they can be connected to a LAN, and then to the internet via another server or internet gateway with an existing IP address. However, this would not be practical in situations where such supporting infrastructure is absent or not economically feasible.

While appliances with embedded servers may be monitored and controlled by a user from any internet connection in the world, it will not efficiently serve multiple users simultaneously due to the inherent limitations of the embedded servers—low processing power, memory and bandwidth. Take a conventional embedded weather station as an example; users may connect to the embedded server to see the temperature, humidity and pressure data on a browser in real-time. However, when more than one user connects at the same time, most of conventional embedded servers will begin to show a dramatic decrease in performance.

Yet another major disadvantage of conventional embedded servers is the need for users to connect to the servers (and hence appliances) individually. For example, a user would need to point the browser's URL to that of the particular appliance to see web pages served from that appliance only. This limitation would become apparent in situations where a user has to monitor and or control hundreds or thousands of appliances simultaneously and in real time. By having to connect to the appliances individually, users will have difficulty extracting data from individual appliance for further computation or producing a composite set of data derived from the data of all the networked appliances In addition, compatibility issues amongst appliances manufactured by an increasingly large number of vendors would hinder them from communicating with each other seamlessly While it would be possible for a user to connect to and program a particular appliance to perform a certain function, it would be difficult to manage such programs as they reside individually in each of the appliance separately.

While the introduction of embedded internet servers provides a means for users and internet-enabled appliances to communicate directly with each other, the physical limitations of processing power, memory and bandwidth in embedded systems make them inherently inefficient or unsuitable for many types of applications. These include applications where multiple users have to be served by a particular appliance simultaneously, a particular user has to access multiple appliances simultaneously; and multiple appliances have to communicate with each other simultaneously.

There is still room for improvement within the art.

1. Field of the Invention

U.S. Class 709/200

2. Description of Related Art Including Information Disclosed Under 37 CFR §1.97**> and 1.98<.

None

SUMMARY OF THE INVENTION

It is the object of this invention to recognize and address the foregoing technical problems and others associated with deploying embedded internet devices in the area of remote monitoring, control and maintenance. Accordingly, it is one general object of the present invention to provide a system and architecture to enable a plurality of users to access a particular appliance simultaneously, a particular user to access a plurality of appliances simultaneously, and a plurality of appliances to communicate with each other simultaneously A more particular object of the present invention is to provide a system whereby said appliances and users communicate with each other through at least one central server located on the internet.

It is another general object of the present invention to provide a system where appliances do not require a static IP address be connected to the internet directly and without the need of a PC or equivalent machine. It is a more particular object of the present invention to further provide such a system where appliances are capable of connecting onto a central server on the internet and disconnecting from said server automatically under a program control residing in the appliance and central server without the need for any human intervention.

It is a further object of the present invention to provide means for users to write, modify, and run customized programs, said programs residing and running from the central server and capable of receiving data from said appliances, processing said data and transmitting processed data to said appliances.

In a preferred embodiment of the present invention, a system and an architecture is provided for appliances to communicate with users and with each other over the internet; such system comprising: embedded internet device means providing a dial-up internet access and internet communication protocols to said appliances, a central server located on the internet through which all communication from said appliances and said users passes, and a software means located in the central server that allows users to write customizable programs that process data received from said appliances and users. The processed data, which can be from a single or a plurality of appliances, allows users to monitor the status of the entire network of appliances connected to the central server. Said customizable software also allows users to send raw or processed data to targeted appliances, thereby giving users the ability to control their network of appliances from a single place.

BRIEF DESCRIPTION OF THE DRAWINGS

A full and enabling disclosure of the present invention to those of ordinary skill in the art, including the best mode thereof, is set forth in the remaining specification, with reference to the accompanying figures, in which.

DESCRIPTION OF THE PREFERRED EMBODIMENT(S)

Figure 1:
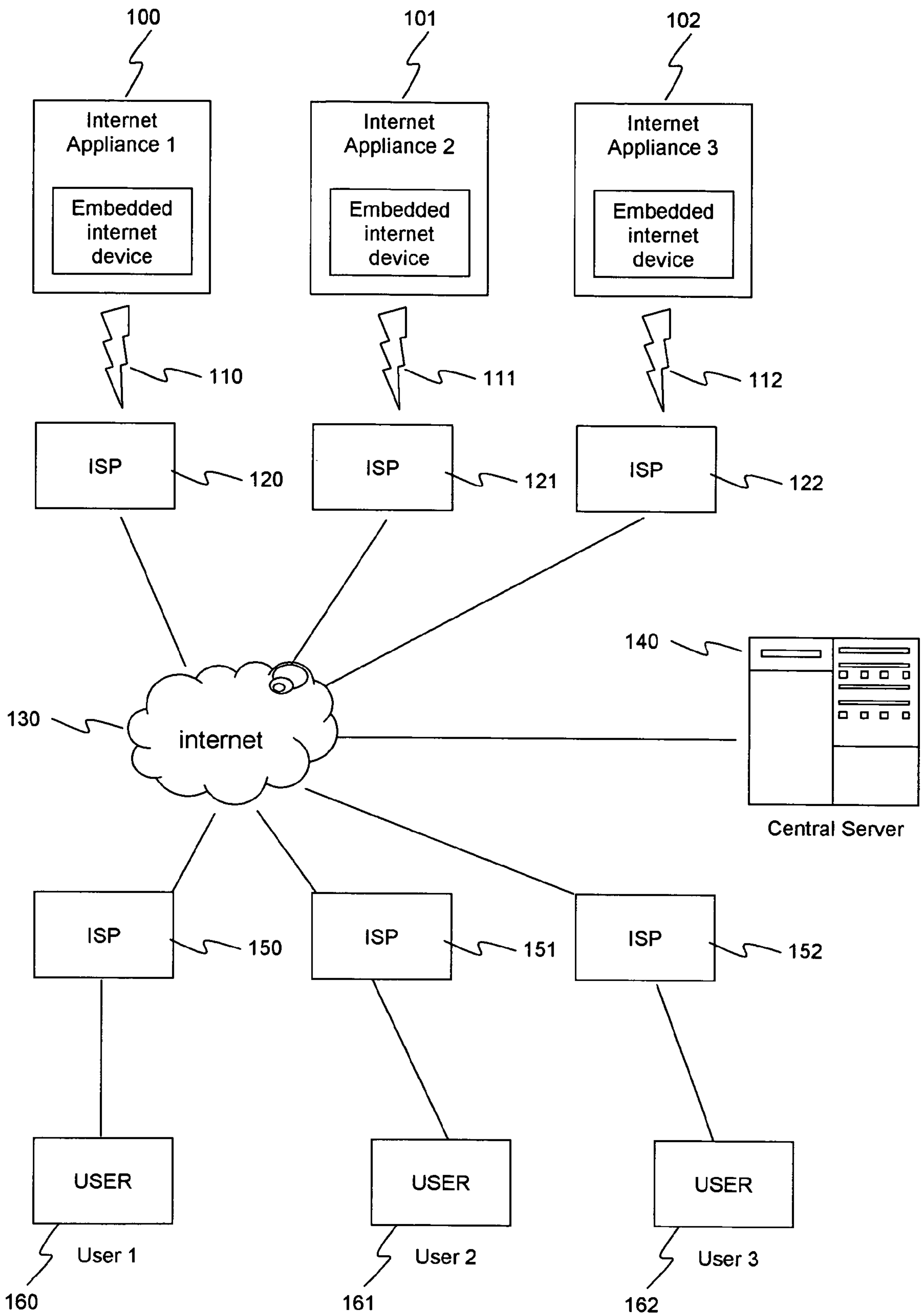
FIG. 1 is a block diagram of one embodiment of a network depicting three representative appliances, a central server, and three representative users.

The present invention relates to an improved means for users to communicate with internet appliances and for internet appliances to communicate with each other. As used herein, an internet appliance or an internet-enabled appliance is an equipment that is capable of connecting to the internet and communicating with other equipment on the internet without the need of any human intervention and without the need to be connected to a PC or equivalent machine. An embedded internet device as used herein refers to a device that provides said internet connectivity to any ordinary appliance or equipment. In some cases, the functionality of the embedded internet device may be a built-in component of an appliance, which makes the latter an internet appliance. In other cases, the embedded internet device may be a separate piece of equipment retrofitted into an existing appliance, turning the latter into an internet appliance.

The following description is presented to enable one of ordinary skill in the art to make and use the invention, and it is provided in the context of a patent application and its requirements. Various modifications to the preferred embodiment will be readily apparent to those skilled in the art, and the generic principles herein may be applied to other embodiments. Thus, the present invention is not intended to be limited to the embodiment shown but is to be accorded the widest scope consistent with the principles and features described herein.

The teachings of the present invention may be better understood by first discussing the architecture of a typical microprocessor. A Central Processing Unit (CPU) is the heart of the microprocessor. It executes a set of instructions stored in its memory known as an application program. The application program typically takes its data from one or more input ports that channel data from the physical world to the CPU to be processed Processed data is sent out to the physical world through one or more output ports. Collectively, the channels through which data is passed from the physical world to the CPU and vice versa is known as input and output (I/O) ports. The power and flexibility of the microprocessor lies in its ability to take any chosen real world signal through its I/O port, process said signal under program control, and use that result to affect the status of any other chosen I/O port, thereby controlling any chosen aspects of the physical world connected to it A user need only to write and subsequently modify said application program(s) in order to interact with all the I/O ports simultaneously. Before the invention of the microprocessor, a user would have to build discrete logic circuits to manipulate individual real-world signals directly.

The limitations faced by using conventional embedded internet servers operating under conventional architectures as discussed in the prior art section above is a result of users having to interact with the individual appliances through their respective embedded internet servers This is akin to utilizing discrete logic circuits to interact with individual real world signals before the invention of the microprocessor as described in the preceding paragraph The main teachings of the present invention revolve around the introduction of a central server through which all actors (appliances and users) communicate.

The architecture as taught in the present invention provides for a central server sitting on the internet, not unlike the CPU of a virtual microprocessor, wherein all internet appliances networked to the central server function like I/O ports of a virtual microprocessor; whereas the user programmable program control means provided at the central server to control the behavior of the internet appliances is similar to the application program residing in the memory of the microprocessor. This architecture, according to the teachings of the present invention allows any user to take any input, real-world signal or parameter, from any internet appliance to process said input under a user program, and to subsequently affect the behavior of any chosen aspect of any internet appliance by transmitting the processed information to the selected internet appliance.

The present invention allows the internet-enabled appliances to send raw data to the central server; wherein all other computational and communication overheads, normally borne by embedded servers, are handled. This frees the embedded appliance of major computational and communication overheads, thus lowering production costs. Without the constraints of low bandwidth, low processing power and limited memory associated with embedded systems, the central server is able to perform computation intensive operations like interacting with database and serving complex Web pages to multiple users much more efficiently then embedded servers For example, an embedded weather station built with a conventional embedded internet server would detect a change in temperature and dynamically generate an HTML page showing the new temperature to any user who logs into the embedded server. With the teachings of this invention, the same embedded weather station would only need to transmit the new temperature data to a central server on the internet. This server is capable of serving any number of similar devices, and could serve HTML pages containing said temperature data from said weather station either by itself or together with data from other devices selected by users. The same set of information could be served to a virtually unlimited number of users simultaneously and in realtime. Utilizing the teachings of the present invention, a typical user in the USA and another in Australia could simultaneously have a web page containing real-time weather information from similarly networked embedded weather stations located in every chosen city in the world displayed and updated in real-time by the central server. All this is done without taxing on the limited resources of the embedded systems, and more significantly, without any performance degradation of said embedded systems.

To more particularly illustrate the architecture, method and system in accordance with the present invention, refer now to FIG. 1 depicting a block diagram of one embodiment of said architecture featuring three representative internet appliances 100, 101 and 102. Each appliance, with a built-in embedded internet device, is capable of initiating a dial up connection to the internet 130 via an internet Service Provider (ISP) 120, 121 and 122 respectively More than one appliance may use the same ISP. The dial up connection may be established by way of communication links 110, 111, and 112 respectively, which may be a fixed telephone line or a wireless link of a mobile telephone network. Once logged into the internet 130, said internet appliances 100, 101, and 102 may communicate with each other via the central server 140 and/or with users 160, 161, and 162 via their respective ISPs 150, 151 and 152. A plurality of internet appliances, ISPs, communication links, and users are shown in FIG. 1 to illustrate the capability of the invention to provide realtime interactivity between multiple internet appliances and multiple users simultaneously. As they have similar characteristics, subsequent detailed description is confined to one representative set of actors consisting of internet appliance 100, communication link 110, ISPs 120 and 150, internet 130, central server 140, and user 160.

Each time internet appliance 100 logs into the internet 130 through ISP 120, it is assigned a dynamic IP address, which is different with each login. To uniquely identify the internet appliance 100 to the central server 140 and user 160 at all times, a distinct identification means in the form of a serial number is embedded into the internet appliance 100 at the time of manufacture. Whenever internet appliance 100 receives a new IP address from the ISP 120, it immediately connects to the central server 140 and reports its serial number together with its current IP address The serial numbers of all registered internet appliances are stored in central server 140 for validation. Once validated, central server 140 is able to map each internet appliance's serial number to its current IP address. Similarly, central server 140 assigns a unique identification means to each user that registers with the network in the form of an account number. When user 160 purchases internet appliance 100, the serial number of internet appliance 100 is registered in user 160's account, giving only user 160 the right to communicate with internet appliance 100. In the preferred embodiment depicted in FIG. 1, the embedded internet device is shown as a built-in component of the internet appliance 100. In many legacy appliances without built-in internet connectivity, said embedded internet device can be built as a stand alone piece of equipment to be retrofitted onto existing appliances, turning the latter into internet appliances.

Figure 2:
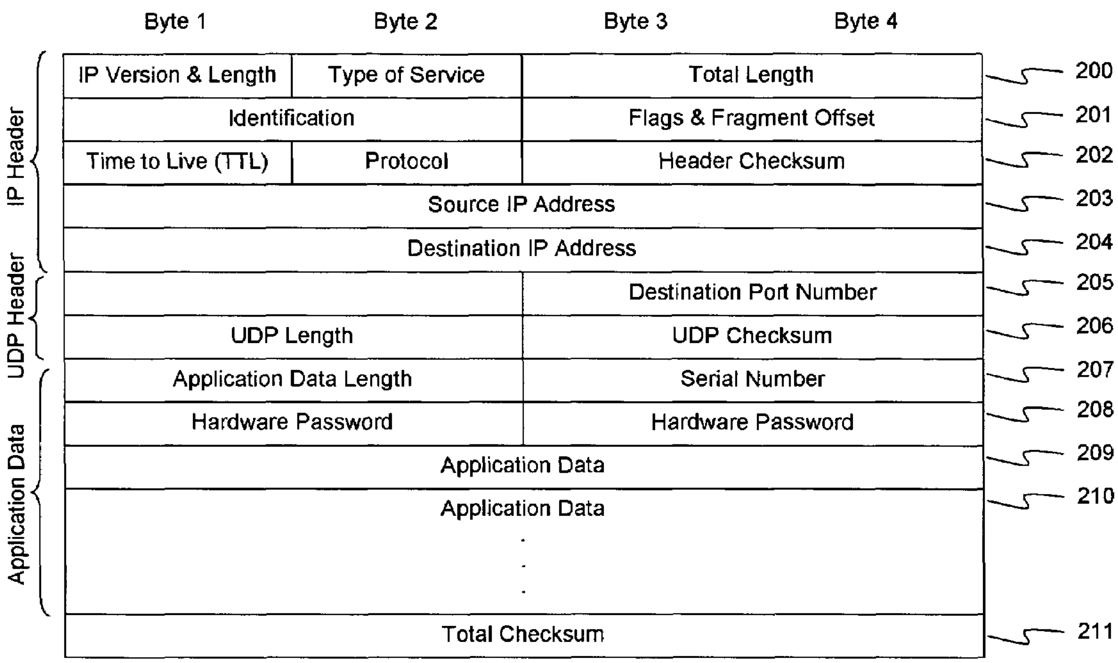
FIG. 2 is a block diagram depicting one embodiment of a packet of devices data.

Data is sent from internet appliance 100 to central server 140 by way of IP data packets as illustrated in FIG. 2. A typical IP data packet consists of an IP Header made up of twenty bytes 200, 201, 202, 203, and 204 containing information that takes the entire packet anywhere on the internet. As the functions and format of the various bytes within the IP Header are well documented in prior art, they will not be described here. Only data specific to the teachings of the current invention will be described.

The Source IP address 203 identifies the internet appliance transmitting the packet, and in this example, it is the dynamic address assigned by ISP 120 to internet appliance 100. The Destination IP address 204 is the static IP address of central server 140, and is embedded into internet appliance 100 at the time of manufacture. This will allow internet appliance 100 to communicate only with central server 140 by default and until such time when the Destination IP Address 204 in internet appliance 100 is changed by user 160 or system administrator of central server 140. Such a change will instruct the internet appliance 100 to communicate with the new central server the next time it logs onto the internet.

The Host-to-Host transport layer chosen for this preferred embodiment is the User Datagram Protocol (UDP). It is to be understood by those of ordinary skill in the art that various other suitable protocols may be employed in this transport layer, including the Transmission Control Protocol (TCP/IP). The UDP Header is made up of bytes 205 and 206. The Source and Destination Port Number 205 is similarly embedded in the internet appliance 100, wherein the Destination Port Number will correspond to the Port Number in central server 140 designated to receive UDP packets from registered internet appliances.

Following the IP Header and UDP Header is the actual application data that is specific to each internet appliance. The application data length and Serial Number 207 defines the number of bytes used by the application data section of the data packet and the Serial Number of the internet appliance respectively. By mapping each internet appliance's Serial Number 207 to the Source IP Address 203, the central server 140 is able to direct any IP data packet as described above to any registered internet appliance. Hardware Password 208 is used to further enhance the security of the network to ensure that only registered internet appliances may communicate with the central server 140. For added security, user 160 may change Hardware Password 208 anytime by first registering the change at the central server 140, followed by writing the new Hardware Password 208 into the targeted device's non-volatile memory. Application Data 209 through 210 may be any form of data from the internet appliance to the central server 140 or vice versa. It may also be system data like configuration data, Hardware Password 208, Destination IP Address 204, Destination Port Number 205, etc. A total checksum 211 is appended after the last byte of application data to ensure data integrity and to completely define the IP data packet on the internet.

While the preceding description is a preferred embodiment of the data format and transport protocol used between a typical internet appliance and a central server, one of ordinary in the art will readily recognize that there could be a variety of means to facilitate such communication. More specifically, it could be easily recognized that established protocols like the Extensible Markup Language (XML) might be employed to carry the information between internet appliances and a central server. For internet appliances with resources to support XML, this may be a preferred protocol because it will allow a greater degree of compatibility among various makes of internet appliances. In addition, central server 140 will be able to serve and network internet appliances with non-proprietary transport protocols and data formats. Other protocols like HTTP, POP3, and SMTP may also be employed. All of the above mentioned protocols are examples of transport protocols that may be employed to carry data among a plurality of internet-enabled appliances, not directly as in a Host-to-Host architecture, but in a client-server architecture according to the teachings of the present invention.

As an added security means, the Application Data 209 section of the IP data packet can be encrypted. This can be done using relatively lightweight encryption algorithms. For mission critical applications, the entire IP packet can be encrypted using industry standard IP encryption methods. However, this would require much higher hardware resources on the internet appliance or the embedded internet access devices.

As the number of appliances with built-in embedded internet connectivity is rather low at present, the embedded internet device may be built as a stand-alone piece of equipment that is retrofitted into existing legacy appliances. Such devices could be built with multiple input and output channels to receive input signals from and to send output data to the target appliance respectively. Alternatively, a serial communication port like the RS232 may be incorporated to interface with legacy appliances that have built-in serial communication ports. Being more universal, reference will be made to the embedded internet device (or devices) instead of the internet appliance as the entity communicating with said central server in the remaining sections of this description.

Figure 3:
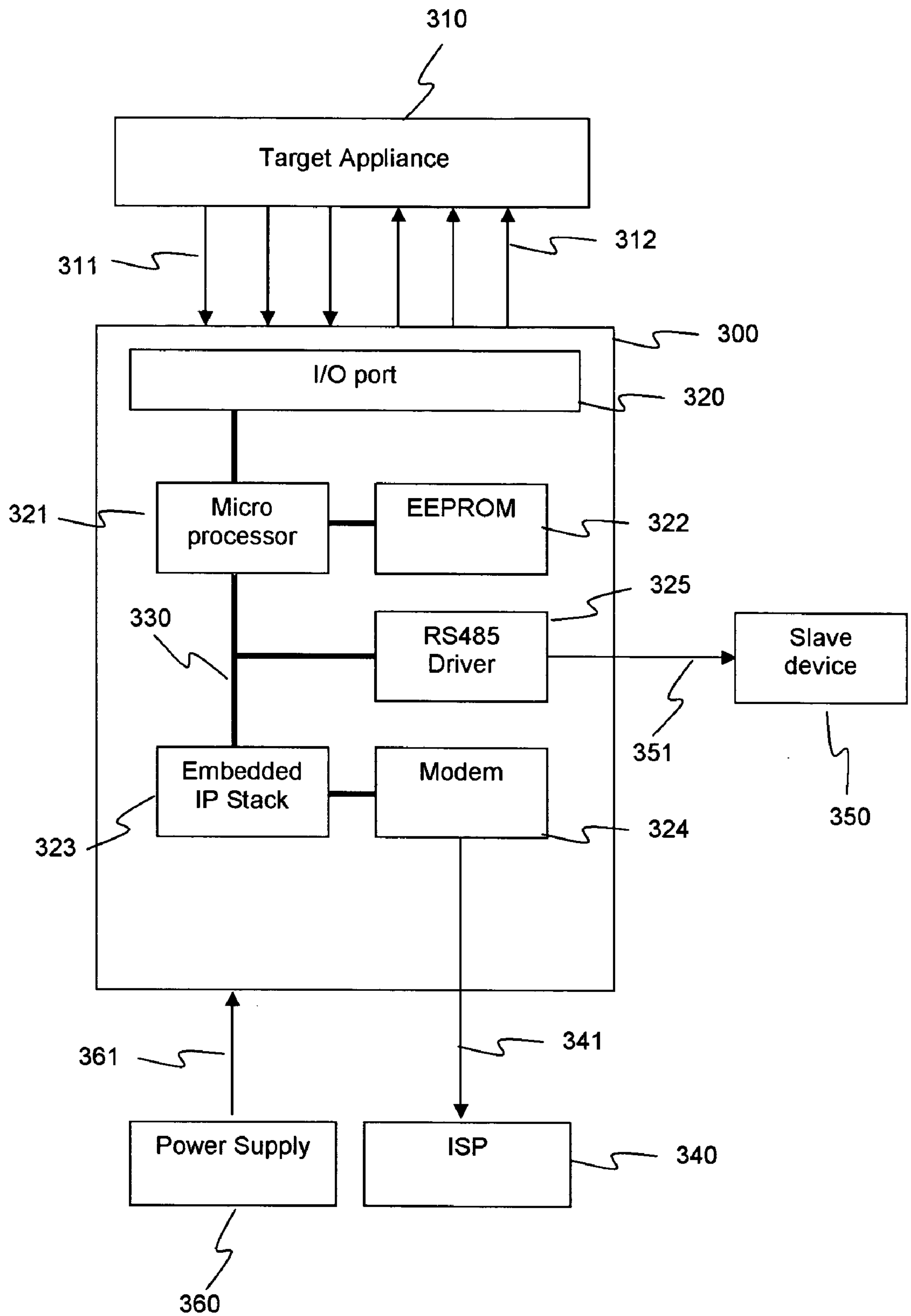
FIG. 3 is a diagram depicting one embodiment of the embedded internet device hardware.

FIG. 3 depicts a method for constructing the embedded internet device 300 that interfaces with target appliance 310. In a preferred embodiment, device 300 interfaces with appliance 310 by way of a plurality of input means 311 and output means 312. Input means 311 can be in the form of a potential free relay contact or a digital 5 Volt DC signal from the appliance 310. Input means 311 can also be configured to accept an analogue signal or a pulse signal from appliance 310, giving device 300 the capability to monitor physical parameters like temperature, pressure, or liquid level and to act as an event counter. Similarly, output means 312 can be a configured as a digital output using a set of potential-free relay contact, an open collector digital output, an analogue, or a pulse output. These plurality of output means enables device 300 to control appliance 310 in a variety of means. In appliances having a serial communication means like a RS232 port, input means 311 and output means 312 may be correspondingly combined into a single RS232 serial communication port.

Input and output means 311 and 312 are interfaced to the microprocessor 321 at the heart of device 300 through I/O port 320. EEPROM 322 is a non-volatile memory that provides data logging functions to temporarily store input signals from appliance 310 when device 300 is not online. Said EEPROM 322 also stores device's system data including serial number, Hardware Password, Destination IP Address and Destination Port Number of central server 140. Embedded IP Stack 323 performs all the internet Protocol related functions like making an IP packet from application data for onward transmission to the central server 140 via modem 324, telephone line 341 and ISP 340. IP stack 323 may be implemented entirely in firmware, in which case it will reside in the Read-Only Memory (ROM) of microprocessor 321, or it may be implemented in hardware using commercially available hardware IP stack Chips like Seiko's S-7600A iChip. An RS485 driver 325 is provided to enable device 300 to form a local area network (LAN) with another Slave device 350 having the same functionality as device 300 but without the IP Stack 323 and Modem 324. Slave device 350 may be used to interface with another appliance or with the same appliance 310 if the number of input 311 and output 312 channels of device 300 is insufficient. A plurality of Slave device 350 may be networked in a multi-drop configuration to device 300 through a screened-twisted pair data cable 351. Employing such a LAN enables a plurality of appliances to be networked to central server 140 with only a single internet connection through a single telephone line. The device 300 to which other Slave devices 350 are connected now acts as an Internet Gateway for all the locally networked Slave devices.

Identification of the Slave devices within the LAN and the internet is accomplished by first registering the serial number of each Slave device with the Gateway to which they are connected. Whenever a new Slave device is attached to a LAN, the Gateway detects said Slave device and registers its serial number in the EEPROM 322. Whenever a new Slave device is detected, said Gateway registers the newly configured LAN by sending the serial number of the Gateway and all locally networked Slave devices to the central server 140. Subsequent communication between Slave devices and the central server takes the form of an IP packet transmitted via the Gateway containing the serial numbers of the Gateway and said Slave device. When the central server 140 receives such an IP packet, it looks for the Source IP Address, which maps into the serial number of the Gateway, and finally to the serial number of the Slave device.

Embedded internet device 300, acting as an interface for target appliance 310, is capable of independently initiating and terminating an internet connection to central server 140 without any human intervention. This is achieved by writing an application program and storing it in the Read Only Memory (ROM) of the microprocessor 321. Said application program contains routines to detect any incoming data at input channels 311. Once new data is detected, an autodialer routine instructs the modem 324 to dial the pre-programmed ISP's telephone number. When the remote modem at the ISP picks up the call, embedded IP stack 323 takes over to negotiate a PPP connection by transmitting the ISP UserID and Password. Upon successful logon to the internet via said ISP, routines within the application program initiates the transmission of an IP data packet to logon to central server 140. This data packet contains, among other things, device 300's serial number, hardware password and current dynamic IP address. Upon successful logon to central server 140, device 300 transmits the newly received data from appliance 310 to central server 140. Once online, appliance 310 and central server 140 can exchange data instantly. Upon a pre-programmed period of inactivity where there is no data exchange between appliance 310 and central server 140, device 300 will terminate the internet connection. This auto-disconnect interval may be set by user 160 and may range from seconds to hours or completely disabled, in which case device 300 would remain online indefinitely.

While device 300 is offline, central server 140 may request, either by a manual command from user 160 or by program control, device 300 to logon on demand. This is achieved by having central server 140 dial the telephone number of device 300 for a pre-determined number of rings. A ring detect mechanism within the modem 324 counts the number of rings but does not answer the call. After the pre-determined number of rings has been sent out, central server 140 drops the call. Device 300 then initiates a call back by making a dial-up connection to the ISP and subsequently logging on to central server as previously described. This call-back method is preferred because it does not incur any long distance or international call charges by the operator of the central server 140. To decrease the possibility of device 300 initiating a call-back sequence resulting from a call made to the telephone number of device 300 by a person, a pre-programmed ring pattern may be programmed into the central server 140 and device 300 respectively. For example, a valid call from central server 140 could be "two rings followed by a 5 second pause, followed by another 3 rings." Any other ring patterns received by device 300 would be ignored.

To ensure the integrity of the entire network, device 300 may be programmed to initiate a logon to central server 140 at regular intervals to report the status of the device 300 and appliance 310. In the event of any failure in the device or communication line, this pre-programmed reporting cannot take place, and central server will detect such anomaly and alert the user 140 and/or the system administrator. Central server 140 sends out said alerts to user 140 by a variety of means including pager, email, Short Message System (SMS) on a mobile phone and a pre-recorded voice message over a phone. Besides system failure alerts, user 140 may also define other events to be alerted using data received from networked devices and appliances.

Figure 4:
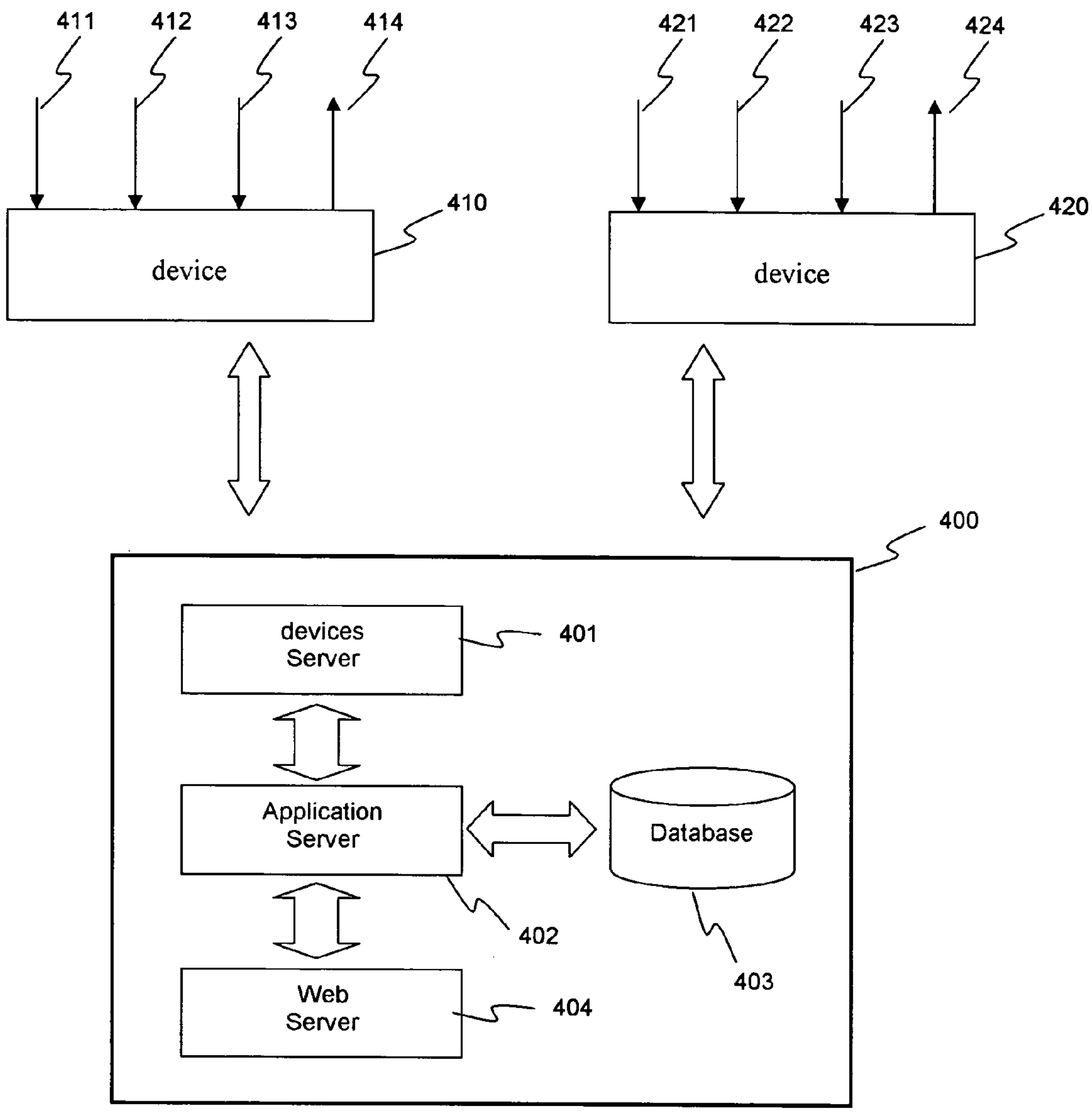
FIG. 4 is a block diagram of one embodiment of the central server

FIG. 4 is a block diagram depicting an example of how a plurality of devices 410 and 420 operate under a user program control in central server 400. Device 410 is a representative device shown here with three digital inputs 411, 412, and 413 and one digital output 414 Device 420 is another representative device shown here with analogue inputs 421, 422, and 423 and digital output 424 All said inputs and outputs may be from any appliance or sensor connected to said devices. Devices 410 and 420 communicate with central server 400 over the internet using IP packets described in the preceding paragraphs. The central server 400 typically consists of several dedicated servers including a Devices Server 401, Application Server 402, and Web Server 404, all linked to a database 403. Said dedicated servers may be server software modules sitting in the same machine that makes up the central server 400, or they may be separate machines running said server software modules networked to each other. Devices Server 401 handles all the communication protocol, validation, and decoding of messages to and from devices 410 and 420. Web Server 404 handles all Hyper Text Transfer Protocol (HTTP) communication with users of the system. Since said Devices Server 401 and Web Server 404 within the central server 400 can be large conventional servers, they can be scaled to handle thousands or even millions of devices and users simultaneously, thus overcoming the limitations of embedded server architecture of prior art Both said servers interact with Database 403 through Application Server 402, which contains a suite of applications allowing users to gather, monitor and organize a device's data It allows for user registration, devices registration, system administration and accounting functions of the system. Users may configure and program the behavior of devices registered under their accounts, including designing a virtual instrument by taking various inputs from various devices and writing a program control means in the application server 402, not unlike treating the central server 400 as the CPU of virtual microprocessor wherein the various devices act as I/O ports of the virtual microprocessor.

For example, a virtual fire alarm control panel that takes inputs from various smoke and heat detectors, confirm the existence of fire by comparing the inputs from various detectors, and then activating a mechanism to discharge inert gas to put out the fire upon confirmation may be easily built by any user using the above architecture. In this example, smoke detectors are connected to digital inputs 411, 412, and 413 of device 410 while analogue heat detectors are connected to inputs 421, 422, and 423 of device 420. An alarm bell is connected to output 414 of device 410 and a gas discharge solenoid is connected to output 424 of device 420. The user then writes a control program in application server 402 using a simple graphical user interface (GUI) means provided by the web server 404. Several lines of codes for a typical control program is illustrated below using common operands like OR, AND, IF, THEN, etc Line 1: IF (channel 411 OR channel 412 OR channel 413 of device 410)=HIGH, THEN (Channel 414 of device 410)=HIGH Line 2: IF (channel 421 OR channel 422 OR channel 423 of device 420)>150, THEN (Channel 414 of device 410) HIGH Line 3: IF (channel 411 OR channel 412 OR channel 413 of device 410)=HIGH AND (channel 421 OR channel 422 OR channel 423 of device 420)>150 THEN (Channel 424 of device 420)=HIGH AND Send email and SMS alert to User In the example above, Lines 1 and 2 would cause the alarm bell connected to channel 414 of device 420 to ring as a warning when any smoke detector is activated or if any heat detector has exceeded an analogue value of 150 units. Line 3 would send an output to discharge an inert gas to put off the fire when the fire has been confirmed by any one smoke detector and any one heat detector. An email and SMS text message is also sent to a pre-programmed mobile phone number to alert the user If the user is online, all the events above can be monitored in real time over the internet using a web browser Advantages The present invention provides a system and architecture to enable a plurality of users to access a particular appliance simultaneously, a particular user to access a plurality of appliances simultaneously, and a plurality of appliances to communicate with each other simultaneously. It provides a system whereby said appliances and users communicate with each other through at least one central server located on the internet.

It can provide a system where appliances do not require a static IP address to be connected to the internet directly and without the need of a PC or equivalent machine. It also provides such a system where appliances are capable of connecting onto a central server on the internet and disconnecting from said server automatically under a program control residing in the appliance and central server and without the need for any human intervention. The present invention provides a means for users to write, modify, and run customized programs, said programs residing and running from the central server and capable of receiving data from said appliances, processing said data, and transmitting processed data to said appliances.

Conclusion, Ramifications, and Scope

With the movement towards internet enabled appliances and devices, the present invention provides much needed solutions on how Internet-enabled appliances and devices communicate with each other and with users simultaneously in real time.

Although the present invention has been described in accordance with the embodiments shown, one of ordinary skill in the art will readily recognize that there could be variations to the embodiments and those variations would be within the spirit and scope of the present invention. More specifically, it could be readily recognized that the entire network could be deployed in an intranet instead of using the internet. Accordingly, many modifications may be made by one of ordinary skill in the art without departing from the spirit and scope of the appended claims.

What is claimed is:

1. A system for monitoring and controlling a plurality of appliances, said system comprising:
- access means providing said appliances with internet connectivity; and
- at least one central server located on the internet, through which all data from said appliances and users of said system passes;
- wherein said system is capable of allowing any said user to simultaneously communicate with a plurality of said appliances in real-time;
- wherein said appliance contains an embedded internet access means built-in as an integral part of said appliance;
- capable of allowing a plurality of said users to simultaneously communicate with any particular said appliance in real-time;
- capable of allowing any said appliance to communicate with a plurality of other said appliances simultaneously and in real-time;
- wherein said appliances automatically logon to said central server at regular pre-programmed intervals to report their status;
- wherein said system has means to send out alerts to said users;
- wherein said system has means to communicate with any other internet enabled device using XML; and
- wherein said system has means to encrypt and decrypt communication between said central server and said appliances.

2. A system for monitoring and controlling a plurality of appliances, said system comprising:
- access means providing said appliances with internet connectivity; and
- at least one central server located on the internet, through which all data from said appliances and users of said system passes;
- wherein said system is capable of allowing any said user to simultaneously communicate with a plurality of said appliances in real-time;
- wherein said appliance contains an embedded internet access means built-in as an integral part of said appliance;
- capable of allowing a plurality of said users to simultaneously communicate with any particular said appliance in real-time;
- capable of allowing any said appliance to communicate with a plurality of other said appliances simultaneously and in real-time;
- wherein said appliances automatically logon to said central server at regular pre-programmed intervals to report their status;
- wherein said appliance connects to said central server using said unique identification means and a password in combination;
- wherein communication between said appliance and said central server is encrypted;
- wherein said system has to send out alerts to said users;
- wherein said system has to communicate with any other internet enabled device using XML; and
- wherein said system has to encrypt and decrypt communication between said central server and said appliances.

3. A system for monitoring and controlling a plurality of appliances, said system comprising:
- access means providing said appliances with internet connectivity; and
- at least one central server located on the internet, through which all data from said appliances and users of said system passes wherein said central server contains software application means for a plurality of users of said system to write and modify said program control means and the writing and modification of said program control means is done through a graphical user interface (GUI);
- wherein said system is capable of allowing any said user to simultaneously communicate with a plurality of said appliances in real-time;
- wherein said appliance contains an embedded internet access means built-in as an integral part of said appliance;
- capable of allowing a plurality of said users to simultaneously communicate with any particular said appliance in real-time;
- capable of allowing any said appliance to communicate with a plurality of other said appliances simultaneously and in real-time;
- wherein said appliances automatically logon to said central server at regular pre-programmed intervals to report their status;
- wherein said system has means to send out alerts to said users;
- wherein said system has means to communicate with any other internet enabled device using XML; and
- wherein said system has means to encrypt and decrypt communication between said central server and said appliances.

* * * * *